UNITED STATES PATENT OFFICE.

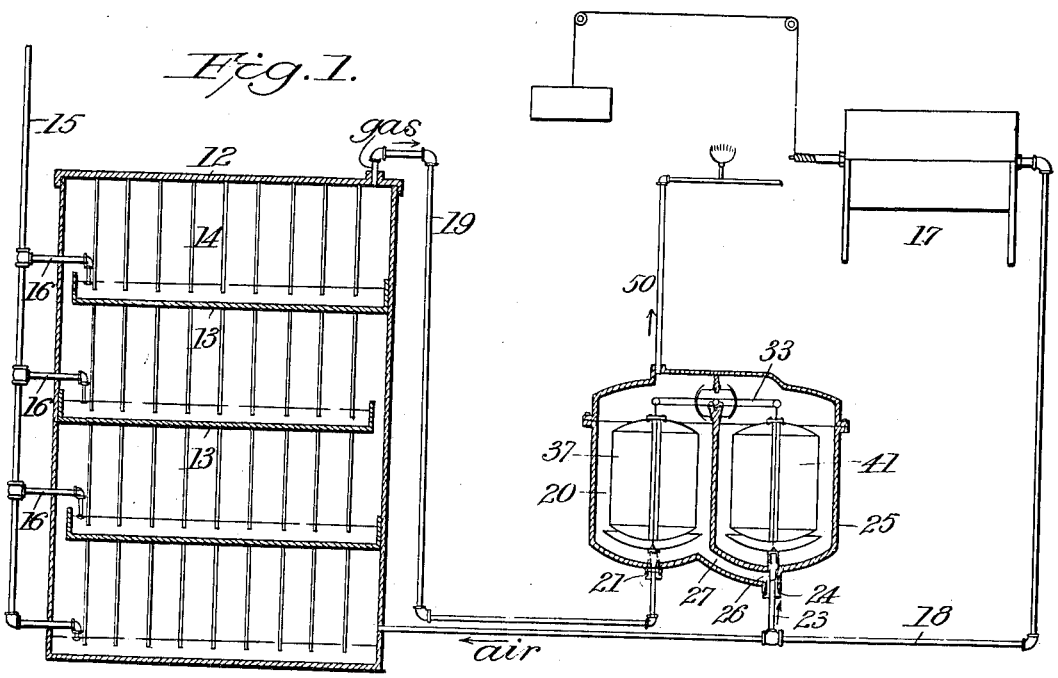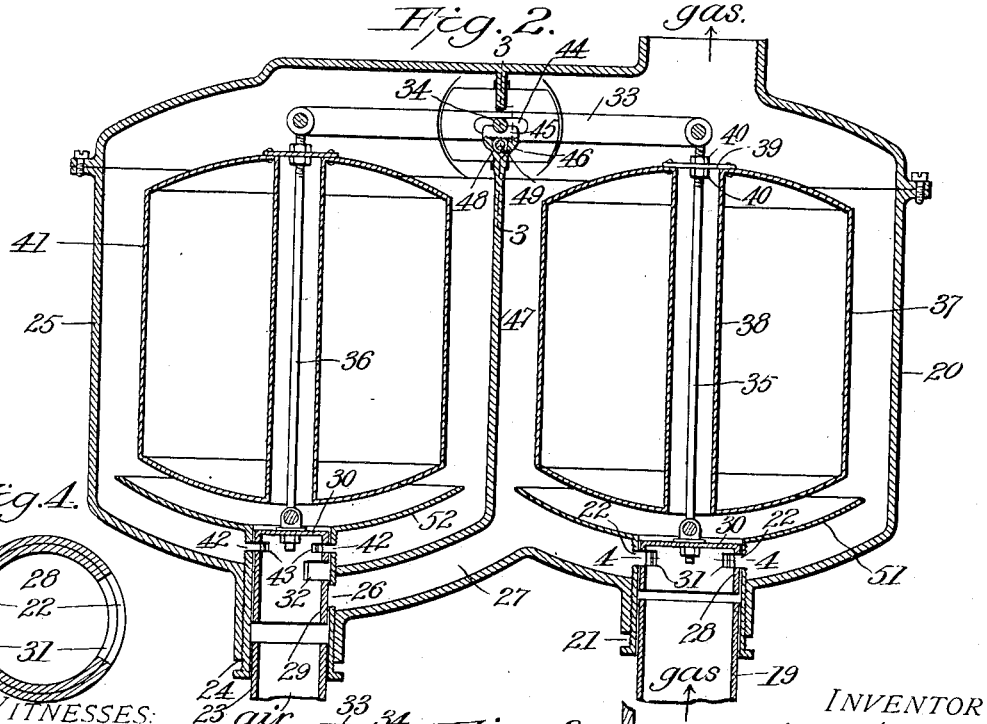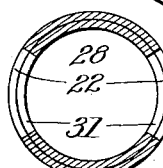

MONROE D. COLBATH, OF HAMPDEN, MAINE.

AIR AND GAS MIXING APPARATUS.

No. 819,124.  Specification of Letters Patent.  Patented May 1, 1906.

Application filed June 10, 1905. Serial No. 264,722.

*To all whom it may concern:*

Be it known that I, MONROE D. COLBATH, of Hampden, in the county of Penobscot and State of Maine, have invented certain new and useful Improvements in Air and Gas Mixing Apparatus, of which the following is a specification.

This invention relates particularly to apparatus for mixing pure atmospheric air with air enriched by hydrocarbon vapor in a carbureter.

It is a well-known fact that the mixture of air and hydrocarbon vapor supplied by a carbureter varies in richness or in the relative proportions of the hydrocarbon and air, such variation being due to different causes, which I do not consider it necessary to enumerate, these being well known.

The invention has for its object to provide means for automatically regulating the dilution with pure air of the mixture delivered by the carbureter.

The invention also has for its object to provide means for manually adjusting the apparatus.

The invention consists in the improvements which I will now proceed to describe and claim.

Of the accompanying drawings, Figure 1 represents a sectional view of a carbureting apparatus including a carbureter, a mixing apparatus, and an air-pump, the latter being shown in elevation. Fig. 2 represents a sectional view, on a larger scale, of the mixing apparatus shown in Fig. 1. Fig. 3 represents a section on line 3 3 of Fig. 2. Fig. 4 represents a section on line 4 4 of Fig. 2.

The same reference characters indicate the same parts in all the figures.

In the drawings, 12 represents a carbureter, which may be of any suitable construction and is here shown as comprising a closed casing containing horizontal pans 13 to receive the liquid hydrocarbon and partitions or baffle-plates 14, located in the spaces between the pans and subdividing said spaces into narrow passages which cause the air supplied to the casing, as hereinafter described, to pass and repass over the oil in each pan as many times as may be deemed necessary to cause it to become thoroughly carbureted. Suitable absorbent material may be placed between these partitions to absorb a portion of the oil by capillary action, and thus increase the capacity of the carbureter. Oil is admitted to the pans 13 by a main supply-pipe 15 and branches 16, communicating with the several pans, suitable float-valves being employed to close the outlets of the branches when the oil rises to a predetermined level in the pans.

17 represents an air-pump, which may be of the well-known types used for forcing air into and through a carbureter, the pump being connected by an air-pipe 18 with the lower portion of the carbureter-casing. The air passes through the spaces and passages between the different pans to the upper portion of the carbureter-casing and becomes carbureted or enriched with the hydrocarbon vapor. For convenience I will hereinafter refer to the mixture of air and hydrocarbon vapor produced as "gas."

19 represents a gas-pipe which conducts the gas from the top of the carbureter-casing to a mixing-chamber 20, the preferred connection between the pipe 19 and the mixing-chamber being through a short sleeve or pipe-section 21, which is screwed into the bottom of the mixing-chamber and receives one end of the pipe 19, the upper portion of the sleeve 21 projecting upwardly into the mixing-chamber and being provided with ports 22 22, through which the gas passes to the mixing-chamber. A connection is provided between the air-pipe 18 and the mixing-chamber, said connection comprising a branch 23 of the air-pipe 18, a sleeve 24, screwed into the bottom of a compartment 25 adjoining or adjacent to the mixing-chamber 20, said sleeve containing an air-port 26 and a passage 27, extending from the port 26 to the mixing-chamber. The sleeves 21 and 24 constitute portions, respectively, of the gas and air conduits, and their inner surfaces constitute seats for the valves, hereinafter described, which valves control the passage of gas through ports 22 of the sleeve 21 and of air through the port 26 of the sleeve 24.

28 represents a valve controlling the gas-conduit, and 29 represents a valve controlling the air-conduit. These valves are all cylindrical in form and have a sliding fit within the sleeves 21 and 24. Each valve has a closed upper end or head 30, constituting a partition across the sleeve in which the valve is located. The gas-valve 28 is provided below its head 30 with ports 31 31, adapted to register with ports 22 22 in the sleeve 21. The air-valve 29 is provided with a port 32, adapted to register with the port 26 in the sleeve 24.

33 represents a lever which is mounted to oscillate upon a fulcrum 34, the lever projecting in opposite directions from the fulcrum. One end of the lever 33 is connected by a rod 35 with the gas-valve 28, and the opposite end of said lever is connected by a rod 36 with the air-valve 29.

37 represents a hermetically-sealed air-chamber, preferably composed of thin sheet metal, such as copper, and preferably of annular form, the inner wall 38 of said air-chamber forming a tubular passage through which the rod 35 passes. The air-chamber 37 is rigidly connected with the rod 35 by means such as strap 39 and nuts 40. 41 represents a similar air-chamber connected with the rod 36. The last-mentioned air-chamber is contained in the compartment 25, which is of such size as to form an air-space surrounding the chamber 41. Said air-space may communicate with the air-conduit above described by means of ports 42 42 in the upper portion of the sleeve 24 and ports 43 43 in the air-valve 29, as shown in Fig. 2.

The fulcrum 34 is movable lengthwise of the lever 33 and in a slot 44 in said lever to enable the length of the arms of the lever to be varied, and thus cause the air-chamber and valve on either end of the lever to overbalance the chamber and valve on the other end of the lever. The weight of the valve, rod, and air-chamber at one end of the lever is practically the same as that of the corresponding parts of the opposite end of the lever, so that when the fulcrum 34 is centrally adjusted the valves will stand in the position shown in Fig. 2, the ports 31 of the gas-valve being fully opened to permit a maximum flow of gas, while the port 32 of the air-valve is closed, so that no air enters the mixing-chamber. If now the fulcrum 34 be moved toward the right, as shown in Fig. 2, the air-valve will descend and the gas-valve will at the same time ascend, the extent of movement imparted to the two valves depending upon the adjustment of the fulcrum. This movement of the fulcrum decreases the flow of gas to the mixing-chamber and admits air thereto. The means for adjusting the fulcrum 34, as here shown, comprise a bearing 45 for the fulcrum, said bearing being movable on a fixed support 46, which is preferably formed on the partition 47, separating the mixing-chamber from the compartment 25. The bearing 45 is provided with rack-teeth engaging a gear 48, affixed to a shaft 49, which is journaled in fixed bearings and projects through one of the walls of the casing, its outer end being provided with a suitable crank, whereby it may be rotated to move the fulcrum 34 in either direction.

The apparatus above described is intended to control the admission of air to the mixing-chamber by the density or richness of the gas admitted to said chamber. A suitable adjustment of the fulcrum 34, determined by the prevailing conditions, enables the air-chamber 37 in the mixing-chamber to vary in height according to the density of the gas. When the gas is of minimum density, the air-chamber 37 will descend to or toward the position shown in Fig. 2, thus increasing the flow of gas and decreasing or shutting off the flow of air. As the density of the gas increases the air-chamber 37 will rise, thus decreasing the flow of gas and increasing the flow of air. It will be seen, therefore, that by adjusting the fulcrum 34 until the result at the burner is satisfactory under the prevailing conditions the operation of the apparatus will be absolutely automatic.

It will be readily understood that since the best results obtained from the consumption of gas at the burners requires a certain proportion of air and vaporized hydrocarbon it is desirable that an apparatus for attaining such proportion shall be extremely sensitive in operation. In the above-described apparatus the mixing-chamber is stationary and the means which are controlled by the density of the gas for adjusting the valves are inclosed within said stationary mixing-chamber and are protected from any influence that the external atmosphere might have, whether such influence be due to wind or other causes. It will be seen, therefore, that the described apparatus, which is controlled entirely by the weight or density of the gas, enables the proportions of atmospheric air and hydrocarbon vapor to be accurately maintained at the desired ratio.

The gas passes from the mixing-chamber to the burners through an outlet-pipe 50.

51 and 52 represent deflectors located above the ports 22 of the sleeve 21 and the ports 42 of the sleeve 24 to deflect the gas and air passing through said ports and prevent direct upward impingement of the same upon the chambers 37 and 41.

I claim—

1. An air and gas stationary mixing apparatus comprising a mixing-chamber, air and gas conduits communicating therewith, an air-valve and a gas-valve controlling the passage of air and gas through said conduits, and automatic means inclosed within said mixing-chamber controlled by the density of the gas for simultaneously adjusting said valves to increase the flow through either valve and correspondingly decrease the flow through the other valve.

2. An air and gas stationary mixing apparatus comprising a mixing-chamber, air and gas conduits communicating therewith, a gas-valve adapted to permit a constant but variable passage of gas to the chamber, an air-valve adapted to permit a variable flow of air to the chamber and to entirely shut off the air-supply, and automatic means inclosed within said mixing-chamber controlled by the density of the gas for simultaneously adjusting said valves to increase the flow through either valve and correspondingly decrease the flow through the other valve.

3. An air and gas stationary mixing apparatus comprising a mixing-chamber, air and gas conduits communicating therewith, valves controlling the passage of air and gas through said conduits, connections between said valves whereby movement imparted to the gas-valve is caused to impart an opposite movement to the air-valve, and means inclosed within said mixing-chamber controlled by the density of the gas for simultaneously adjusting the valves.

4. An air and gas stationary mixing apparatus comprising a mixing-chamber, air and gas conduits communicating therewith, valves controlling the passage of air and gas through said conduits, an oscillatory lever connected at its end portions with the valves and fulcrumed between its ends, whereby the valves are caused to move simultaneously in opposite directions, and means inclosed within said mixing-chamber controlled by the density of the gas for determining the position of the lever and valves.

5. An air and gas mixing apparatus comprising a mixing-chamber, air and gas conduits communicating therewith, valves controlling the passage of air and gas through said conduits, an oscillatory lever connected at its end portions with the valves, an adjustable fulcrum for said lever whereby the length of its arms may be varied to vary the initial positions of the valves, and means inclosed within said mixing-chamber controlled by the density of the gas for determining the position of the lever and valves.

6. An air and gas mixing apparatus comprising a mixing-chamber, air and gas conduits communicating therewith, valves controlling the passage of air and gas through said conduits, an oscillatory lever connected at its end portions with the valves, a fulcrum for said lever, a movable bearing for said fulcrum, means for adjusting said bearing, and means inclosed within said mixing-chamber controlled by the density of the gas for determining the position of the lever and valves.

7. An air and gas mixing apparatus comprising a mixing-chamber, air and gas conduits communicating therewith, valves controlling the passage of air and gas through said conduits, an oscillatory lever connected at its end portions with the valves, a fulcrum for said lever, a movable bearing for said fulcrum, said bearing having a rack, and an operating-shaft journaled in fixed bearings and having a gear meshing with said rack.

8. An air and gas stationary mixing apparatus comprising a mixing-chamber, air and gas conduits communicating therewith, valves for said conduits, an oscillatory lever connected at its end portions with the valves and fulcrumed between its ends, hermetically-sealed air-chambers supported by the end portions of the lever, one of said chambers being located in the mixing-chamber, and the other outside the mixing-chamber.

9. An air and gas stationary mixing apparatus comprising a mixing-chamber, air and gas conduits communicating therewith, valves, for said conduits, an oscillatory lever connected at its end portions with the valves and fulcrumed between its ends, hermetically-sealed air-chambers supported by the end portions of the lever, one of said chambers being located in the mixing-chamber, and a compartment adjacent to the mixing-chamber containing the other air-chamber.

10. The combination of a carbureter, an air-forcing apparatus connected with the carbureter, a stationary mixing-chamber, gas and air conduits connecting the said chamber with the carbureter and air-forcing apparatus respectively, valves controlling said conduits, and automatic means inclosed within said mixing-chamber controlled by the density of the gas for simultaneously adjusting said valves to increase the flow through either valve and simultaneously decrease the flow through the other valve.

In testimony whereof I have affixed my signature in presence of two witnesses.

MONROE D. COLBATH.

Witnesses:
J. E. HALL,
MARY E. RIPLEY.